(12) United States Patent
Zhou (10) Patent No.: US 10,564,451 B2
(45) Date of Patent: Feb. 18, 2020

(54) PANEL AND METHOD FOR MANUFACTURING THE SAME

(71) Applicant: BOE TECHNOLOGY GROUP CO., LTD., Beijing (CN)

(72) Inventor: Xiaodong Zhou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/545,095

(22) PCT Filed: Jan. 6, 2017

(86) PCT No.: PCT/CN2017/070369
§ 371 (c)(1),
(2) Date: Jul. 20, 2017

(87) PCT Pub. No.: WO2017/185825
PCT Pub. Date: Nov. 2, 2017

(65) Prior Publication Data
US 2019/0041672 A1  Feb. 7, 2019

(30) Foreign Application Priority Data

Apr. 28, 2016 (CN) .......................... 2016 1 0274497

(51) Int. Cl.
*G02F 1/13* (2006.01)
*G02F 1/1333* (2006.01)
(Continued)

(52) U.S. Cl.
CPC ...... *G02F 1/1303* (2013.01); *G02F 1/133305* (2013.01); *G02F 1/133514* (2013.01);
(Continued)

(58) Field of Classification Search
CPC .... G02F 1/1303; G02F 1/13; G02F 1/133305; G02F 1/133514; G02F 1/134309;
(Continued)

(56) References Cited

U.S. PATENT DOCUMENTS

2002/0089633 A1  7/2002  von Gutfeld et al.
2002/0176046 A1  11/2002  Kitamura et al.

FOREIGN PATENT DOCUMENTS

CN  1388818 A  1/2003
CN  101561591 A  * 10/2009
(Continued)

OTHER PUBLICATIONS

International Search Report and Written Opinion for Application No. PCT/CN2017/070369, dated Mar. 30, 2017, 11 Pages.

*Primary Examiner* — Nathanael R Briggs
(74) *Attorney, Agent, or Firm* — Brooks Kushman P.C.

(57) ABSTRACT

The present disclosure provides a panel and a method for manufacturing the panel. The panel includes a first substrate and a second substrate arranged opposite to the first substrate. The first substrate is provided with an electric field curing region configured to be provided with an electric field curable material. The electric field curable material is arranged between the first substrate and the second substrate and at a position corresponding to the electric field curing region. The electric field curable material is capable of being cured and/or decomposed under the action of an electric field.

17 Claims, 3 Drawing Sheets

(51) Int. Cl.
  *G02F 1/1335*   (2006.01)
  *G02F 1/1343*   (2006.01)
  *G02F 1/135*    (2006.01)
(52) U.S. Cl.
  CPC .............. *G02F 1/134309* (2013.01); *G02F 2001/1357* (2013.01); *G02F 2001/133354* (2013.01); *G02F 2202/28* (2013.01)
(58) Field of Classification Search
  CPC . G02F 2001/133354; G02F 2001/1357; G02F 2202/28
  See application file for complete search history.

(56) References Cited

FOREIGN PATENT DOCUMENTS

| | | |
|---|---|---|
| CN | 101561591 A | 10/2009 |
| CN | 101840111 A | 9/2010 |
| CN | 105739138 A | 7/2016 |
| JP | 2007302635 A | 11/2007 |

* cited by examiner

PANEL AND METHOD FOR MANUFACTURING THE SAME

CROSS-REFERENCE TO RELATED APPLICATIONS

This application is the U.S. national phase of PCT Application No. PCT/CN2017/070369 filed on Jan. 6, 2017, which claims priority to Chinese Patent Application No. 201610274497.5 filed Apr. 28, 2016, the disclosures of which are incorporated in their entirety by reference herein.

TECHNICAL FIELD

The present disclosure relates to the field of liquid crystal display technology, in particular to a panel and a method for manufacturing the same.

BACKGROUND

During the manufacture of a display device, usually it is necessary to attach, or adhere by an adhesive, two substrates arranged opposite to each other, so as to perform preset processes and then the two substrates are separated. However, the yield of the product may be probably reduced during this procedure. For example, an ultrathin substrate attached on a carrier substrate may be damaged in separating them from each other, a liquid crystal material may be damaged in curing the adhesive using ultraviolet rays, a long period may be taken for thermocuring the adhesive, and so on.

Due to such requirements on the display device as small thickness, high display quality, curved surface or flexibility, it is necessary to improve processes (e.g., an adhesion or separation process) and the adhesive for the manufacture of the display device, so as to improve the quality of the display device.

SUMMARY

In one aspect, the present disclosure provides in some embodiments a panel, including a first substrate and a second substrate arranged opposite to the first substrate. The first substrate is provided with an electric field curing region configured to be provided with an electric field curable material. The electric field curable material is arranged between the first substrate and the second substrate and at a position corresponding to the electric field curing region. The electric field curable material is capable of being cured and/or decomposed under the action of an electric field.

In a possible embodiment of the present disclosure, the electric field curable material is capable of being cured in an electric field in a first direction, and/or capable of being decomposed in an electric field in a direction opposite to the first direction.

In a possible embodiment of the present disclosure, an electrode is arranged at the electric field curing region and configured to generate the electric field.

In a possible embodiment of the present disclosure, the first substrate is a carrier substrate, the second substrate is an ultrathin substrate, and the carrier substrate is configured to carry the ultrathin substrate during the manufacture of the ultrathin substrate.

In a possible embodiment of the present disclosure, the electric field curing region is an entire area on a side of the carrier substrate.

In a possible embodiment of the present disclosure, the first substrate is a display substrate, the electric field curing region is a sealant region where a sealant is arranged, and the sealant region is provided with an electrode.

In a possible embodiment of the present disclosure, the electrode includes a plurality of electrode blocks spaced from each other.

In a possible embodiment of the present disclosure, the electrode includes a continuous strip-like electrode.

In a possible embodiment of the present disclosure, the electrode has a width smaller than a width of the sealant region.

In a possible embodiment of the present disclosure, the width of the electrode is between 5% and 95% of the width of the sealant region.

In a possible embodiment of the present disclosure, an electrode is arranged on the second substrate at a region opposite to the sealant region and configured to cooperate with the electrode at the sealant region to generate an electric field to cure the electric field curable material.

In a possible embodiment of the present disclosure, the sealant further includes a thermocurable material.

In a possible embodiment of the present disclosure, the electric field curable material is a carbene polymer.

In another aspect, the present disclosure provides in some embodiments a method for manufacturing a panel, including a step of applying an electric field between a first substrate and a second substrate of the panel arranged opposite to each other to cure an electric field curable material between the first substrate and the second substrate under the action of the electric field. The first substrate is provided with an electric field curing region configured to be provided with the electric field curable material. The electric field curable material is arranged between the first substrate and the second substrate and at a position corresponding to the electric field curing region.

In a possible embodiment of the present disclosure, the first substrate is a display substrate, the electric field curing region is a sealant region where a sealant is arranged, and the sealant region is provided with an electrode. The step of applying the electric field between the first substrate and the second substrate to cure the electric field curable material includes applying a voltage to the electrode to form the electric field between the electrode on the first substrate and the second substrate to cure the sealant.

In a possible embodiment of the present disclosure, the sealant further includes a thermocurable material, and the method further includes heating the sealant.

In a possible embodiment of the present disclosure, the first substrate is a carrier substrate, and the second substrate is an ultrathin substrate. Prior to applying the electric field, the method further includes: providing the electric field curable material at the electric field curing region on the carrier substrate; and placing the ultrathin substrate on the electric field curable material. The step of applying the electric field between the first substrate and the second substrate to cure the electric field curable material includes: curing the electric field curable material by using an electric field in a first direction to fix the ultrathin substrate onto the carrier substrate.

In a possible embodiment of the present disclosure, the method further includes: performing a predetermined operation on the ultrathin substrate; and decomposing the electric field curable material by using an electric field in a direction opposite to the first direction to separate the ultrathin substrate from the carrier substrate.

In a possible embodiment of the present disclosure, the method further includes cleaning the ultrathin substrate.

In a possible embodiment of the present disclosure, in the event that an electrode is arranged at the electric field curing region, the electric field in the first direction and the electric field in the direction opposite to the first direction are generated by applying a voltage of 0 to 20V to the electrode. The electric field in the first direction is maintained for a period of T1, and the electric field in the direction opposite to the first direction is maintained for a period of T2, where $0 < T1 \leq 60$ s and $0 < T2 \leq 120$ s.

In a possible embodiment of the present disclosure, the electric field curable material has a thickness of 10 µm to 300 µm.

BRIEF DESCRIPTION OF THE DRAWINGS

The following drawings merely relate to some embodiments of the present disclosure, and based on these drawings, a person skilled in the art may obtain the other drawings without any creative effort.

DETAILED DESCRIPTION

To make the objects, the technical solutions and the advantages of the present disclosure more apparent, the present disclosure will be described hereinafter in conjunction with the drawings and embodiments.

The present disclosure provides in some embodiments of the present disclosure a panel, including a first substrate and a second substrate arranged opposite to the first substrate. The first substrate is provided with an electric field curing region configured to be provided with an electric field curable material. The electric field curable material is further arranged between the first substrate and the second substrate and at a position corresponding to the electric field curing region. The electric field curable material is capable of being cured and/or decomposed under the effect of an electric field (or magnetic field). In a possible embodiment of the present disclosure, the electric field curable material is capable of being cured in an electric field in a first direction, and/or capable of being decomposed in an electric field in a direction opposite to the first direction.

According to the panel in the embodiments of the present disclosure, through the electric field curing region configured to be provided with the electric field curable material, it is possible to adhere the first substrate to the second substrate via the electric field curable material, and meanwhile any other mechanisms of the panel may not be adversely affected by the electric field. As a result, it is possible to prevent the product quality from being adversely affected in the curing or decomposing procedure.

In a possible embodiment of the present disclosure, the electric field curing region may be any region on the substrate.

In a possible embodiment of the present disclosure, the electric field for curing the electric field curable material may be generated by an electrode or electrodes on the first substrate and/or the second substrate, or by any other electric field generation mechanism not arranged on the first substrate and the second substrate.

In some embodiments of the present disclosure, the first substrate is a carrier substrate, and the electric field curable material is capable of being cured in a first electric field and decomposed in an electric field in a direction opposite to the first electric field. The second substrate is an ultrathin substrate, and the carrier substrate is configured to carry the ultrathin substrate during the manufacture of the ultrathin substrate. The electric field curable material is capable of being decomposed in the electric field in direction opposite to a first direction. The ultrathin substrate may have a thickness below a predetermined threshold, which may be determined according to the practical requirements.

In future, the display device tends to be of a small thickness, a high quality, curved surfaces and being flexible. To achieve this display device, ultrathin substrate processes, including a process for manufacturing the ultrathin substrate and a process for forming a display element on the ultrathin substrate, may be provided. During the manufacture of the ultrathin substrate, it may be processed merely after it has been attached onto the carrier substrate. After the processes, the ultrathin substrate needs to be separated from the carrier substrate. During the attachment and the separation, the ultrathin substrate may probably be damaged, thus the yield of the product may be adversely affected.

Usually, a common carrier substrate has a relatively large thickness and is made of glass, so there is a relative strong interaction force between the ultrathin substrate and the carrier substrate. Especially after high-temperature processing, the force may increase to an extent so that the two substrates cannot be separated from each other. In order to reduce this force and facilitate the separation of the substrates from each other, an indium tin oxide (ITO) film or any other film having a very small thickness may be applied, by sputtering or coating, onto the carrier substrate. However, in actual tests, the results are not satisfactory, e.g., it is difficult to separate the substrates from each other, and the yield of the product is relatively low.

In the embodiments of the present disclosure, in the case that the ultrathin substrate is carried on the carrier substrate, an adhesive material between the carrier substrate and the ultrathin substrate is the electric field curable material which is capable of being cured and decomposed under the action of the electric field. As a result, it is possible to facilitate the curing and separation procedures, the technical difficulty is low, the curing and separating effects are under control, thereby effectively improving the yield of the processes associated with the ultrathin substrate.

Figure 1A:
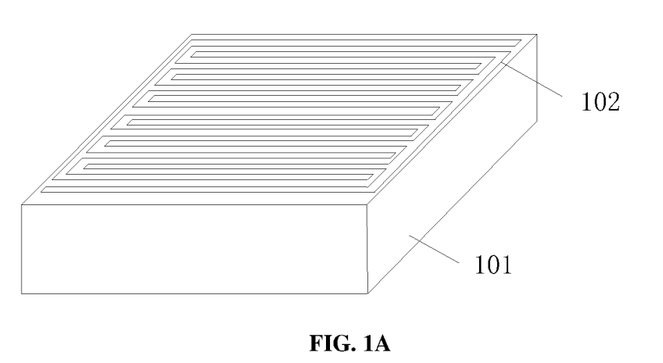
FIG. 1A is a schematic view showing a carrier substrate according to the embodiments of the present disclosure.

As shown in FIG. 1A, in a particular embodiment, in the case that the first substrate is a carrier substrate 101, the electric field curing region may be any region on the carrier substrate 101. For example, the electric field curing region may be a peripheral region on the substrate, or an entire area on a side of the substrate.

In a possible embodiment of the present disclosure, the electric field curing region is an entire area on a side of the carrier substrate.

In some embodiments of the present disclosure, with reference to FIG. 1A again, an electrode 102 is arranged at the electric field curing region and configured to generate an electric field to cure the electric field curable material.

Figure 1B:
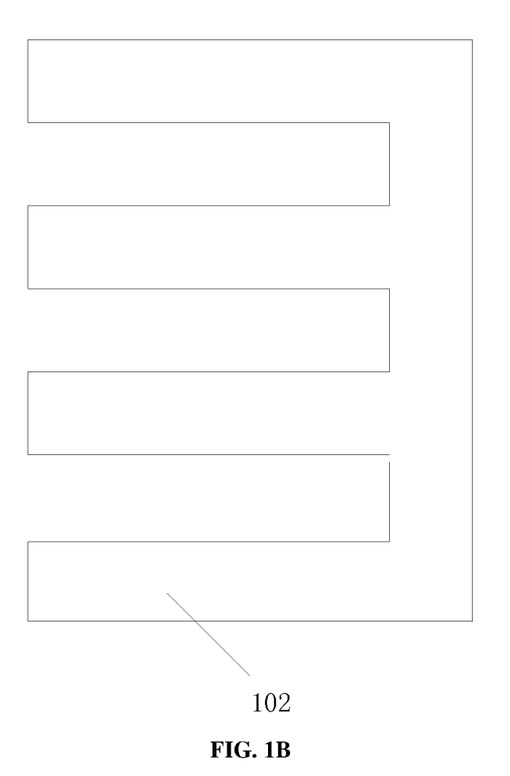
FIG. 1B is a schematic view showing an electrode on the carrier substrate according to the embodiments of the present disclosure.

The electrode may be of a comb-like shape as shown in FIGS. 1A and 1B, or any other shapes. As shown in FIGS. 1A and 1B, the electrode 102 may include a group of positive electrodes and a group of negative electrodes, the positive electrodes and the negative electrodes each is of the comb-like shape as shown in FIGS. 1A and 1B and are arranged on the carrier substrate 101 alternately. Each positive electrode may be separated from the corresponding negative electrode at a certain distance, so as to enable the electrode 102 to generate the electric field.

In a possible embodiment of the present disclosure, the electrode may be made of ITO (Indium Tin Oxide).

Figure 2:
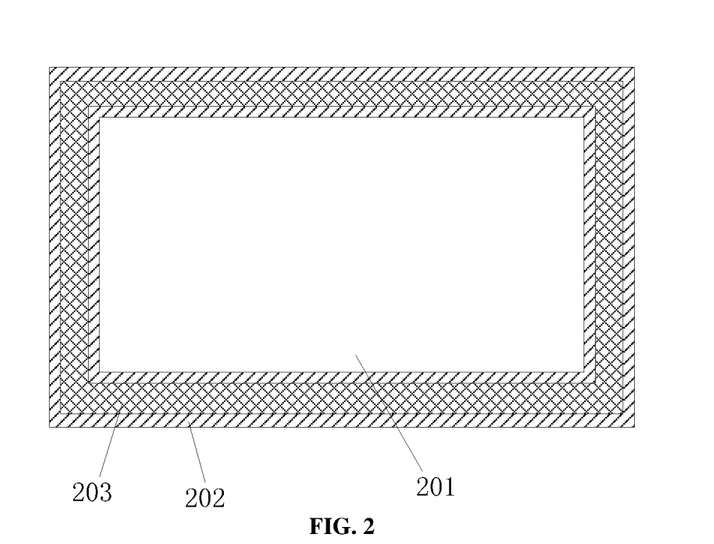
FIG. 2 is a schematic view showing a display substrate according to the embodiments of the present disclosure.

In some embodiments of the present disclosure, as shown in FIG. 2, the first substrate may be a display substrate 201, and the electric field curing region may be a sealant region 202 where a sealant is arranged. An electrode 203 may be arranged at the sealant region 202, and the sealant region 202 may be located outside a display region on the display substrate 201.

In the related art, an ultraviolet (UV) curing process and a thermocuring process are used for curing the sealant during the mass production of liquid crystal display (LCD), where a UV-curable adhesive and a thermocurable adhesive are adopted respectively. During the actual manufacture, these two curing processes are used simultaneously, i.e., a pre-curing procedure is performed using the UV curing process, and then a fully-curing procedure is performed using the thermocuring process.

The two curing processes both have advantages and disadvantages. For the UV curing process, the UV-curable material may be cured at a rapid speed, but the curing effect may be affected by UV light uniformity and an aperture ratio, and the liquid crystal material may be damaged by UV light. For the thermocuring process, a better curing effect and high strength may be achieved, and no influence may be caused to the liquid crystal material, but a long time period needs to be taken, resulting in decreased production efficiency.

According to the panel in the embodiments of the present disclosure, the first substrate may be provided with the sealant region configured to be provided with the sealant, and the sealant may include the electric field curable material. The electrode may be further arranged at the sealant region to cure the sealant in the electric field in the subsequent procedure, and prevent liquid crystal molecules from being adversely affected during the curing procedure of the conventional sealant. In addition, through the electric field curing process, it is possible to cure the sealant more rapidly and completely. In the related art, after the substrates are arranged opposite to each other, the upper substrate and the lower substrate may be moved to the curing region while the sealant is not completely cured. During the movement, because the sealant is not cured, displacement may probably occur between the two substrates, thereby the alignment effect and the final product quality may be adversely affected. In the embodiments of the present disclosure, the electrode is arranged at the sealant region, and after the alignment of the two substrates, a voltage may be applied to the electrode immediately so as to generate the electric field and pre-cure the sealant. As a result, it is possible to prevent the displacement between the substrates during the movement, thereby ensuring the alignment effect.

With reference to FIG. 2 again, the electrode 203 may be a continuous strip-like electrode, or it may include a plurality of electrode blocks spaced from each other. The plurality of electrode blocks may include positive electrodes and negative electrodes spaced from each other. The plurality of electrode blocks may also be of an identical polarity.

In some embodiments of the present disclosure, the electrode may be a continuous strip-like electrode.

In some embodiments of the present disclosure, the electrode may have a width smaller than that of the sealant region, so as to prevent the subsequent normal display of the display device from being adversely affected by the electrode.

In some embodiments of the present disclosure, the electrode may have a width between 5% and 95% of a width of the sealant region.

In some embodiments of the present disclosure, an electrode may be arranged on the second substrate at a region opposite to the sealant region and configured to cooperate with the electrode on the first substrate so as to generate an electric field for curing the electric field curable material. In other words, the second substrate may have a structure as shown in FIG. 2.

Figure 3A:
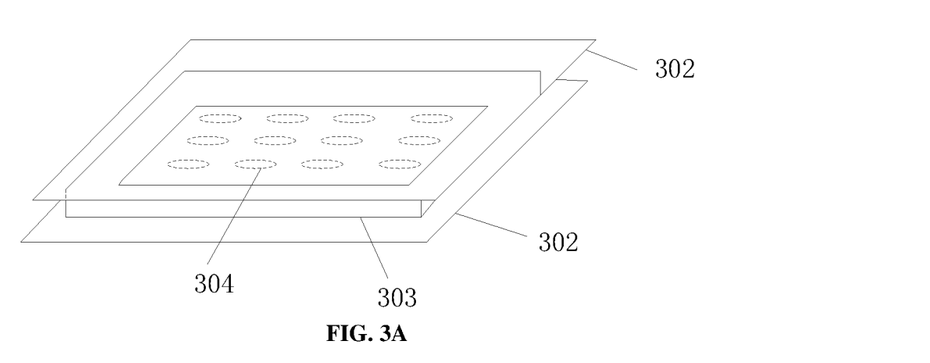
FIG. 3A is a schematic view showing a first substrate and a second substrate arranged opposite to each other according to the embodiments of the present disclosure.
Figure 3B:
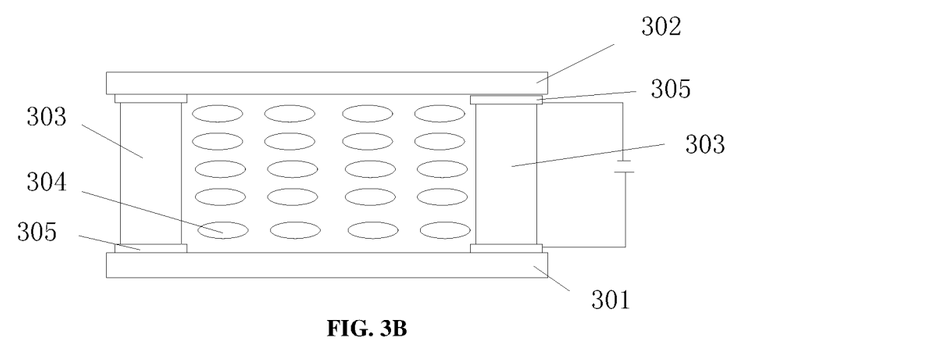
FIG. 3B is another schematic view showing the first substrate and the second substrate arranged opposite to each other according to the embodiments of the present disclosure.

As shown in FIGS. 3A and 3B, in a particular embodiment, the panel includes a first substrate and a second substrate arranged opposite to the first substrate. The first substrate is an array substrate 301, the second substrate is a color filter substrate 302, and a sealant 303 is arranged between the array substrate 301 and the color filter substrate 302. The sealant 303 includes the electric field curable material. A liquid crystal layer 304 is further arranged between the array substrate 301 and the color filter substrate 302, and an electrode 305 is arranged at a sealant region between the array substrate 301 and the color filter substrate 302.

In a possible embodiment of the present disclosure, the electric field curable material may be a carbene polymer. The carbene polymer is capable of being attached onto a surface of an object in an electric field, so as to achieve the electric field curing procedure. The amount of the carbene polymer attached onto the object may be controlled by adjusting a voltage applied to the electrode and a period for applying the voltage. Hence, through the addition of the carbene polymer into the sealant, it is possible to adjust hardness of the sealant by adjusting the voltage, thereby meeting the requirements of different products. No UV light is used during the curing procedure, and the liquid crystal material is not adversely affected by the electric field, so it is possible to prevent the liquid crystal material from being damaged. In addition, the carbene polymer is used as an adhesive between the ultrathin substrate and the carrier substrate, so it is also possible to adjust the hardness of the adhesive by adjusting the voltage and the period for applying the voltage, so as to meet the requirements of different production lines. Further, the curing procedure is reversible, i.e., a reverse voltage may be applied to decompose the adhesive, so it is possible to prevent the ultrathin substrate from being damaged during the attachment and separation, thereby improving the yield of the ultrathin substrate.

In a possible embodiment of the present disclosure, the sealant may further include a thermocurable material.

Figure 4:
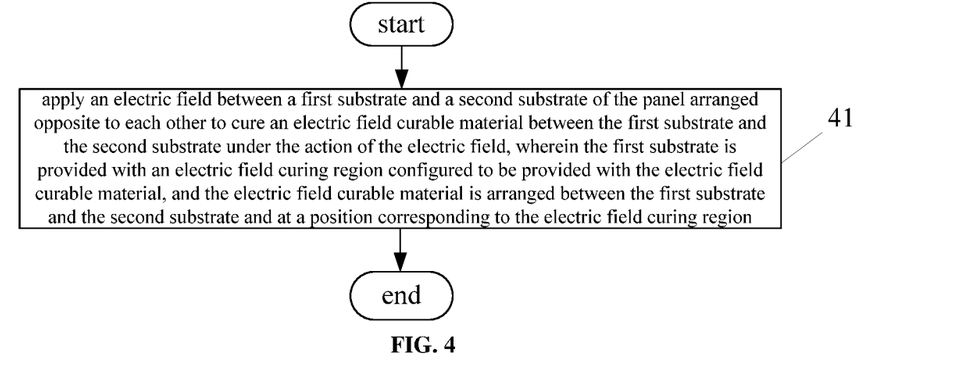
FIG. 4 is a flow chart of a manufacturing method according to the embodiments of the present disclosure.

The present disclosure further provides in some embodiments a method for manufacturing a panel as shown in FIG. 4. The method includes Step 41 of applying an electric field between a first substrate and a second substrate of the panel arranged opposite to each other to cure an electric field curable material between the first substrate and the second substrate under the action of the electric field.

The first substrate is provided with an electric field curing region configured to be provided with the electric field curable material. The electric field curable material is arranged between the first substrate and the second substrate and at a position corresponding to the electric field curing region.

In a possible embodiment of the present disclosure, the first substrate is a display substrate 201 provided with the electric field curing region, as shown in FIG. 2. The electric field curing region is a sealant region 202 configured to be provided with a sealant, and an electrode 203 is arranged at the sealant region 202. The sealant is arranged at the sealant region between the first substrate and the second substrate. At Step 41, a voltage may be applied to the electrode to form the electric field between the first substrate and the second substrate to cure the sealant. A range of the electric field may be adjusted based on an actual process, so as to achieve high uniformness and rapid curing. As a result, the curing effect may be achieved using less power, and thus the energy consumption may be reduced and green production may be achieved.

In a possible embodiment of the present disclosure, another electrode may also be arranged on the second substrate and configured to cooperate with the electrode on the first substrate, so as to generate the electric field for curing the electric field curable material.

In some embodiments of the present disclosure, the sealant may include both the electric field curable material and a thermocurable material. Subsequent to the step of applying the voltage to the electrode so as to generate the electric field between the first substrate and the second substrate and cure the sealant, the method further includes heating the sealant.

The present disclosure provides in some embodiments a panel, including a first substrate and a second substrate arranged opposite to the first substrate. The first substrate is an array substrate, and the second substrate is a color filter substrate. The array substrate and the color filter substrate are each provided with an electric field curing region. The electric field curing region is a sealant region configured to be provided with a sealant. A continuous strip-like electrode or a plurality of electrode blocks spaced from each other is arranged at the sealant region. The electrode has a width between about 5% and 100% of a width of the sealant region. The sealant is arranged between the first substrate and the second substrate and at a position corresponding to the sealant region. The sealant includes the electric field curable material which is capable of being cured in an electric field. The sealant is arranged between the array substrate and the color filter substrate and at a periphery of each of the array substrate and the color filter substrate.

The panel may be manufactured by: preparing the array substrate and the color filter substrate; applying the electric field curable sealant onto the color filter substrate through screen printing or ruling; dripping a liquid crystal material onto a surface of the array substrate; feeding the substrates into a vacuum alignment device; reducing, by the vacuum alignment device, a liquid crystal cell thickness to a predetermined value; starting an electric filed curing device to apply an electric field to cure the sealant; and performing subsequent procedures similar to those already known in the art.

The present disclosure further provides in some embodiments a panel including a first substrate and a second substrate arranged opposite to the first substrate. The first substrate is an array substrate, and the second substrate is a color filter substrate. The array substrate and the color filter substrate are each provided with an electric field curing region. The electric field curing region is a sealant region configured to be provided with a sealant. A continuous strip-like electrode or a plurality of electrode blocks spaced from each other is arranged at the sealant region. The electrode has a width between about 5% and 100% of a width of the sealant region. The sealant is arranged between the first substrate and the second substrate and at a position corresponding to the sealant region. The sealant includes the electric field curable material which is capable of being cured in an electric field and a thermocurable material. The sealant is arranged between the array substrate and the color filter substrate and at a periphery of each of the array substrate and the color filter substrate.

The panel may be manufactured by: preparing the array substrate and the color filter substrate; applying the electric field curable sealant onto the color filter substrate through screen printing or ruling; dripping a liquid crystal material onto a surface of the array substrate; feeding the substrates into a vacuum alignment device; reducing, by the vacuum alignment device, a liquid crystal cell thickness to a predetermined value; starting an electric filed curing device to apply an electric field and pre-cure the sealant; heating the sealant so as to fully cure the sealant; and performing subsequent procedures similar to those already known in the art.

Figure 5:
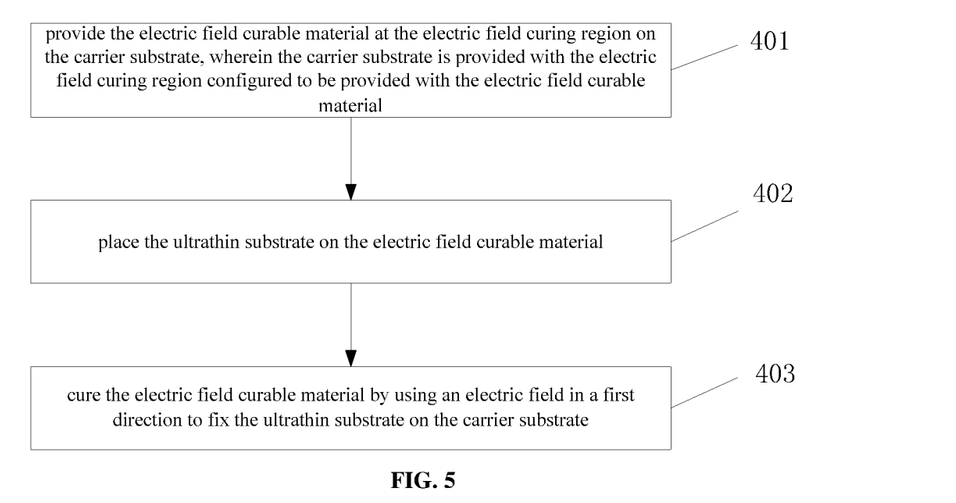
FIG. 5 is another flow chart of the manufacturing method according to the embodiments of the present disclosure.

The present disclosure further provides in some embodiments a method for manufacturing a panel which, as shown in FIG. 5, includes: Step 401 of providing an electric field curable material at an electric field curing region on a carrier substrate, the electric field curing region configured to be provided with the electric field curable material; Step 402 of placing an ultrathin substrate on the electric field curable material; and Step 403 of curing the electric field curable material in an electric field in a first direction to fix the ultrathin substrate onto the carrier substrate.

In the embodiments of the present disclosure, the carrier substrate is configured to carry thereon the ultrathin substrate during the manufacture of the ultrathin substrate.

In a possible embodiment of the present disclosure, an electrode is arranged at the electric field curing region on the carrier substrate and configured to generate the electric field to cure the electric field curable material.

In some embodiments of the present disclosure, subsequent to curing the electric field curable material in the electric field to fix the ultrathin substrate onto the carrier substrate, the method further includes: performing a predetermined operation on the ultrathin substrate; and decomposing the electric field curable material in an electric field in a direction opposite to the first direction to separate the ultrathin substrate from the carrier substrate.

In a possible embodiment of the present disclosure, subsequent to decomposing the electric field curable material in the electric field in a direction opposite to the first direction to separate the ultrathin substrate from the carrier substrate, the method further includes cleaning the ultrathin substrate.

In a possible embodiment of the present disclosure, in the case that an electrode is arranged at the electric field curing region, the electric field in the first direction and the electric field in the direction opposite to the first direction are generated by applying a voltage of 0 to 20V to the electrode. The electric field in the first direction is maintained for a period of T1, and the electric field in the direction opposite to the first direction is maintained for a period of T2, where 0<T1≤60 s and 0<T2≤120 s.

In a possible embodiment of the present disclosure, the carrier substrate is made of glass, and the ultrathin substrate has a thickness smaller than the carrier substrate. At least one pair of electrodes is arranged at a surface of the carrier substrate. In order to facilitate the curing and separation procedures, the electrodes may be designed as strip-like structures parallel to each other or any other structures, and the shape thereof may be determined according to the practical requirements. The electrodes may be formed through known sputtering and etching processes.

Figure 6:
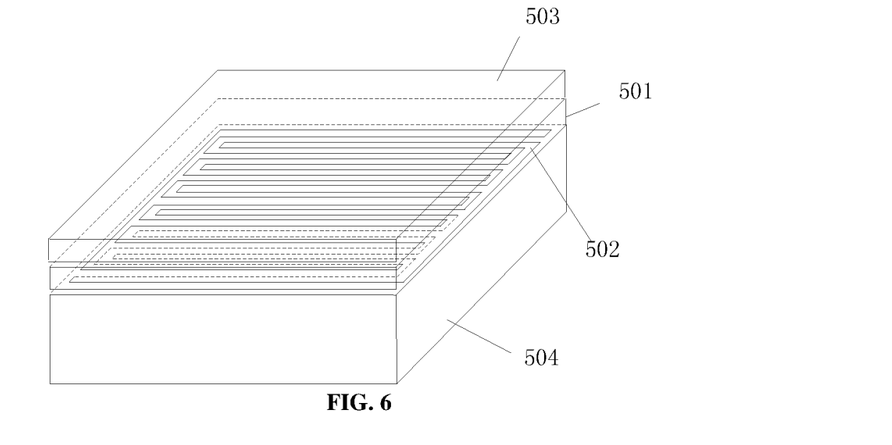
FIG. 6 is a schematic view showing a state where an ultrathin substrate is adhered onto the carrier substrate according to the embodiments of the present disclosure.

In a possible embodiment of the present disclosure, as shown in FIG. 6, the method for manufacturing an ultrathin substrate may include the following steps:

providing a carbene polymer 501 on a carrier substrate 502 through transferring, spinning or scraping, and the carbene polymer 501 having a thickness of 10 µm to 300 µm;

placing an ultrathin substrate 503 onto the carrier substrate 502, and applying a negative voltage of 0 to 20V to an electrode 504 for 0 to 60 s; other parameters being possible according to the practical requirements;

after processing operations on the ultrathin substrate 503, apply a positive voltage of 0 to 20V to the electrode 504 for 0 to 120 s, until the carbene polymer 501 is completely decomposed and the ultrathin substrate 503 is capable of being separated from the carrier substrate 502.

In a possible embodiment of the present disclosure, the ultrathin substrate 503 may then be cleaned.

For the curing process, after the preparation of the carrier substrate, it may be placed in a manner as shown in FIG. 1, and then a negative voltage of 0 to −20V may be applied to electrodes 21 and 22 for 0 to 60 s. A value of the voltage and a period may be determined in accordance with a required curing strength and a required attachment effect.

For the separation process, after the completion of the machining operation, a positive voltage of 0 to 20V may be applied to the electrodes 21 and 22 for 0 to 120 s, until the electric field curable material is completely decomposed. Then, the ultrathin substrate may be separated from the carrier substrate and then cleaned for the subsequent process.

It should be appreciated that, the voltage for the curing process or the separation process may be of a constant value or vary over time, and the value of the voltage may be greater than or equal to 20V, which is not limited in the present disclosure.

According to the panel, the sealant curing method and the ultrathin substrate manufacturing method in the embodiments of the present disclosure, the first substrate and the second substrate may be adhered to each other through the electric field curable material, simplifying a curing procedure after the substrates are aligned. Further, a liquid crystal material in the product may not be adversely affected by the electric field for curing, so it is possible to ensure the product quality. In addition, it is possible to prevent the panel from being damaged due to the curing procedure using the electric field. The electric field curable material is capable of being cured or decomposed in the electric field, so it is possible to apply the electric field curable material to the manufacture of a product where one substrate needs to be fixed to or separated from another substrate.

It should be appreciated that, the above embodiments are for illustrative purposes only, but shall not be used to limit the scope of the present disclosure. The embodiments and the features therein may be combined with each other on a non-conflicting basis.

Apparently, a person skilled in the art may make further modifications and improvements without departing from the spirit and scope of the present disclosure, and these modifications and improvements shall also fall within the scope of the claims and equivalents thereof, and the present disclosure is intended to include these modifications and improvements.

What is claimed is:

1. A panel, comprising a first substrate and a second substrate arranged opposite to the first substrate, wherein the first substrate is provided with an electric field curing region configured to be provided with an electric field curable material, the electric field curable material is arranged between the first substrate and the second substrate and at a position corresponding to the electric field curing region, and the electric field curable material is capable of being cured in an electric field in a first direction and being decomposed under the action of an electric field in a direction opposite to the first direction.

2. The panel according to claim 1, wherein an electrode is arranged at the electric field curing region and configured to generate the electric field.

3. The panel according to claim 1, wherein the first substrate is a carrier substrate, the second substrate is an ultrathin substrate, and the carrier substrate is configured to carry the ultrathin substrate during a manufacture of the ultrathin substrate.

4. The panel according to claim 3, wherein the electric field curing region is an entire area on a side of the carrier substrate, or a peripheral region of the carrier substrate.

5. The panel according to claim 2, wherein the first substrate is a display substrate, the electric field curing region is a sealant region where a sealant is arranged, and the sealant region is provided with an electrode.

6. The panel according to claim 5, wherein the electrode comprises a plurality of electrode blocks spaced from each other, or a continuous strip-like electrode.

7. The panel according to claim 5, wherein the electrode has a width smaller than a width of the sealant region.

8. The panel according to claim 7, wherein the width of the electrode is between 5% and 95% of the width of the sealant region.

9. The panel according to claim 5, wherein an electrode is arranged on the second substrate at a region opposite to the sealant region and configured to cooperate with the electrode at the sealant region to generate an electric field.

10. The panel according to claim 5, wherein the sealant further comprises a thermocurable material.

11. The panel according to claim 1, wherein the electric field curable material is a carbene polymer.

12. The panel according to claim 1, wherein the electric field curable material is capable of being cured in an electric field in a first direction, and/or capable of being decomposed in an electric field in a direction opposite to the first direction.

13. A method for manufacturing a panel, comprising:
applying an electric field, generated by an electric field generation mechanism, between a first substrate and a second substrate of the panel arranged opposite to each other to cure an electric field curable material between the first substrate and the second substrate under the action of the electric field, wherein the electric field generation mechanism is not arranged on either of the first substrate or the second substrate, wherein the first substrate is provided with an electric field curing region configured to be provided with the electric field curable material, and the electric field curable material is arranged between the first substrate and the second substrate and at a position corresponding to the electric field curing region;

wherein the first substrate is a carrier substrate, and the second substrate is an ultrathin substrate, the method further comprises, prior to applying the electric field:

providing the electric field curable material at the electric field curing region on the carrier substrate; and placing the ultrathin substrate on the electric field curable material, and the step of applying the electric field between the first substrate and the second substrate to cure the electric field curable material comprises: curing the electric field curable material by using the electric field in a first direction to fix the ultrathin substrate on the carrier substrate;

wherein the method further comprises:

performing a predetermined operation on the ultrathin substrate; and separating the ultrathin substrate from the carrier substrate by decomposing the electric field curable material using the electric field in a direction opposite to the first direction.

14. The method according to claim 13, further comprising cleaning the ultrathin substrate.

15. The method according to claim 13, wherein the electric field curable material has a thickness of 10 μm to 300 μm.

16. The method according to claim 13, wherein the electric field curing region is an entire area on a side of the carrier substrate.

17. A method for manufacturing a panel, comprising:

applying an electric field, generated by an electric field generation mechanism, between a first substrate and a second substrate of the panel arranged opposite to each other to cure an electric field curable material between the first substrate and the second substrate under the action of the electric field, wherein the electric field generation mechanism is not arranged on either of the first substrate or the second substrate, wherein the first substrate is provided with an electric field curing region configured to be provided with the electric field curable material, and the electric field curable material is arranged between the first substrate and the second substrate and at a position corresponding to the electric field curing region;

wherein the first substrate is a carrier substrate, and the second substrate is an ultrathin substrate, the method further comprises, prior to applying the electric field:

providing the electric field curable material at the electric field curing region on the carrier substrate; and placing the ultrathin substrate on the electric field curable material, and the step of applying the electric field between the first substrate and the second substrate to cure the electric field curable material comprises: curing the electric field curable material by using the electric field in a first direction to fix the ultrathin substrate on the carrier substrate;

wherein the electric field curable material is capable of being cured in an electric field in a first direction and being decomposed in an electric field in a direction opposite to the first direction.

* * * * *